UNITED STATES PATENT OFFICE.

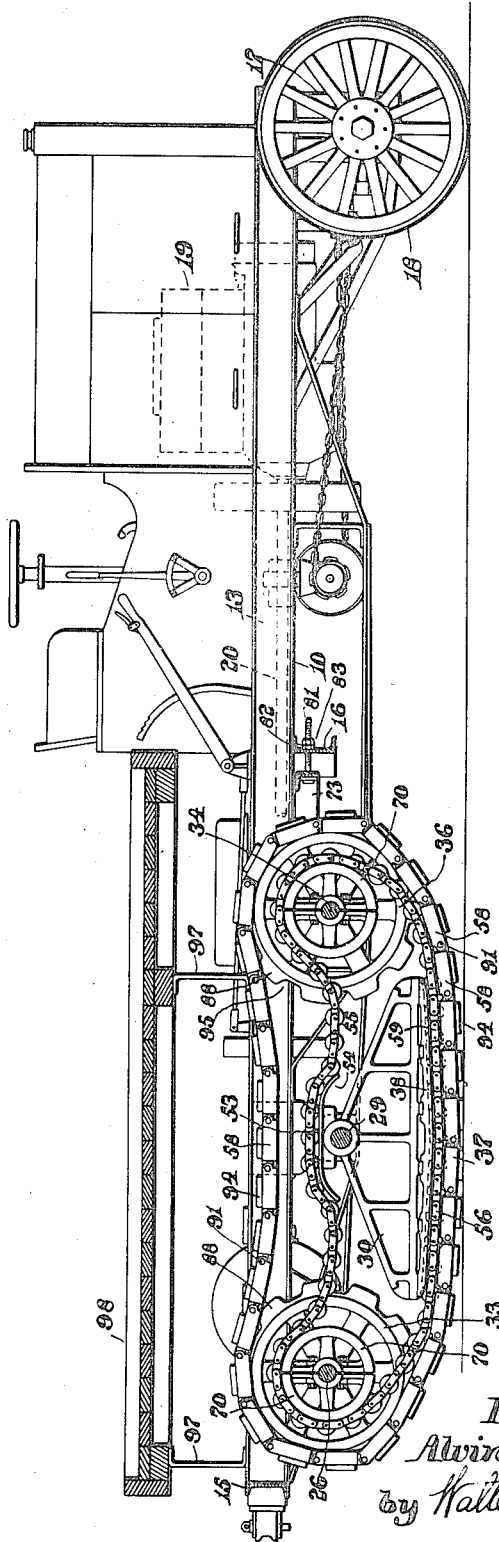

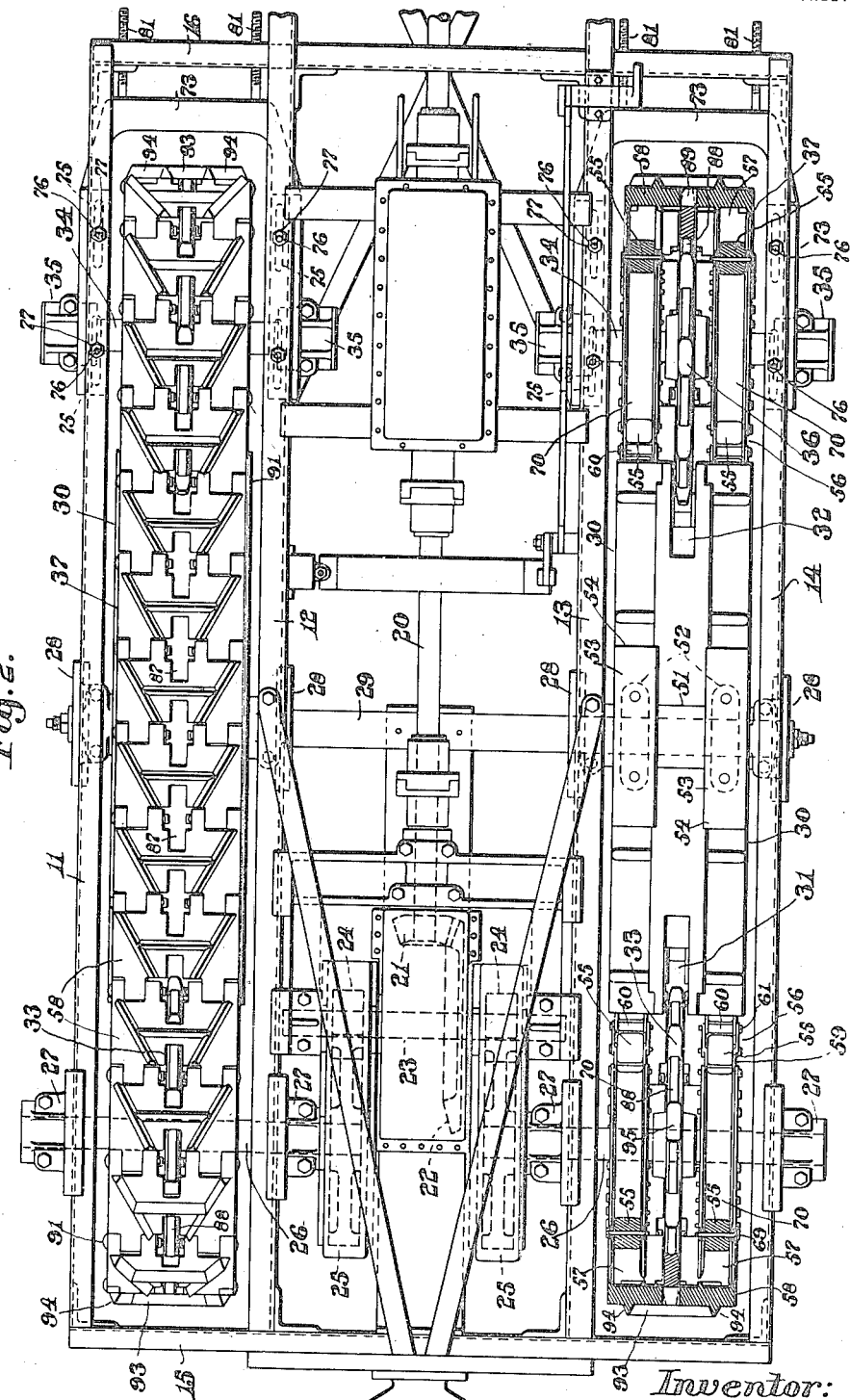

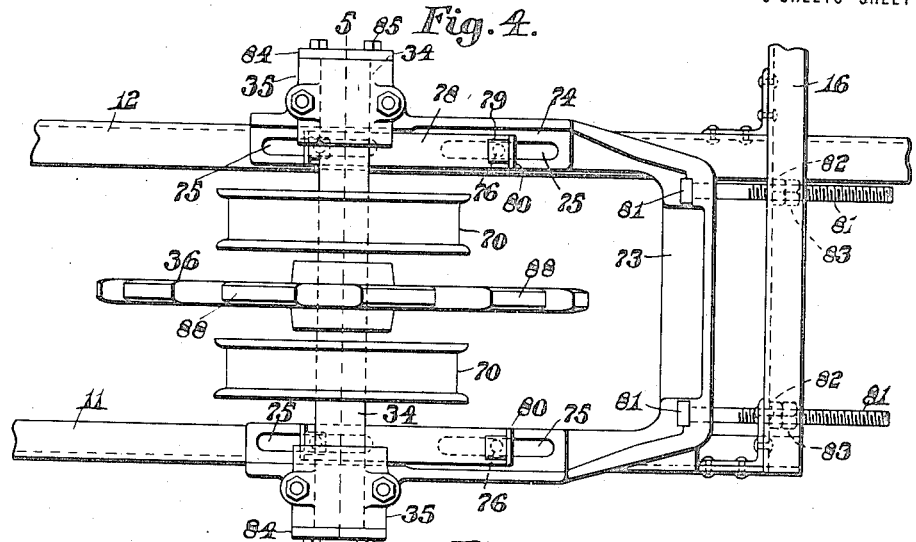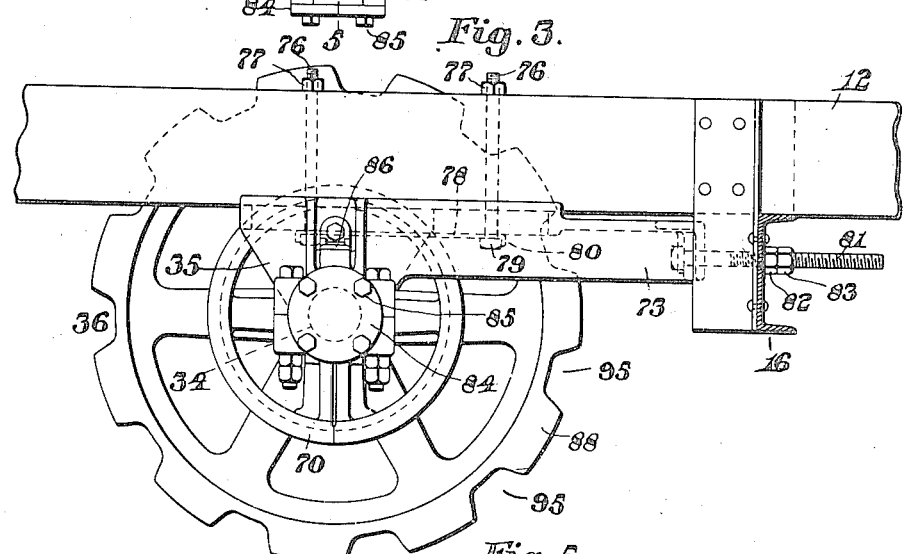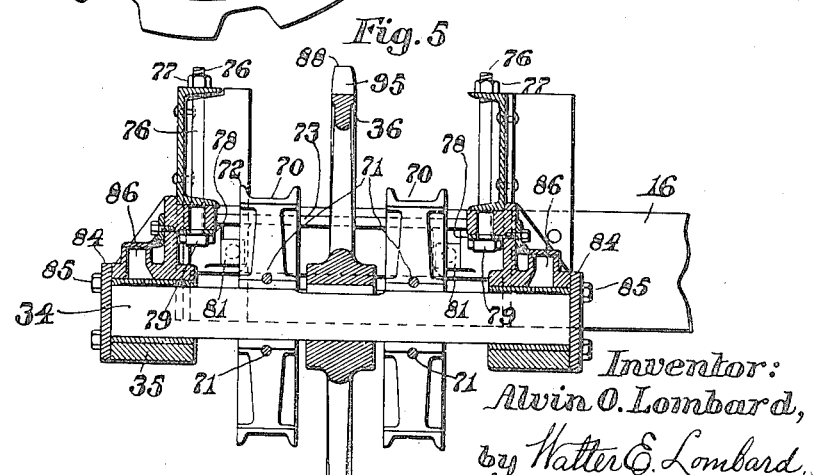

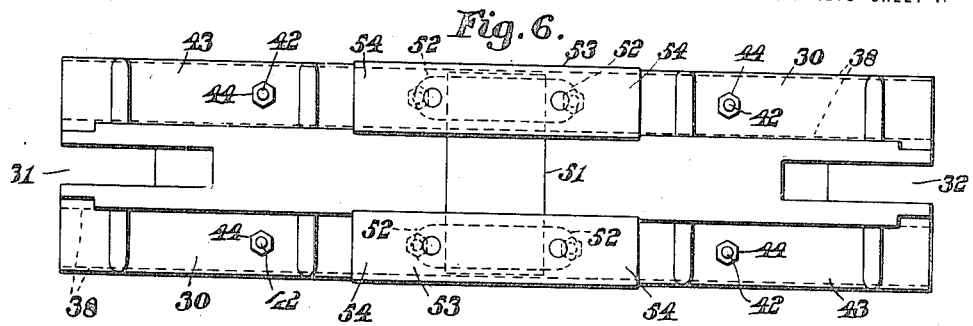
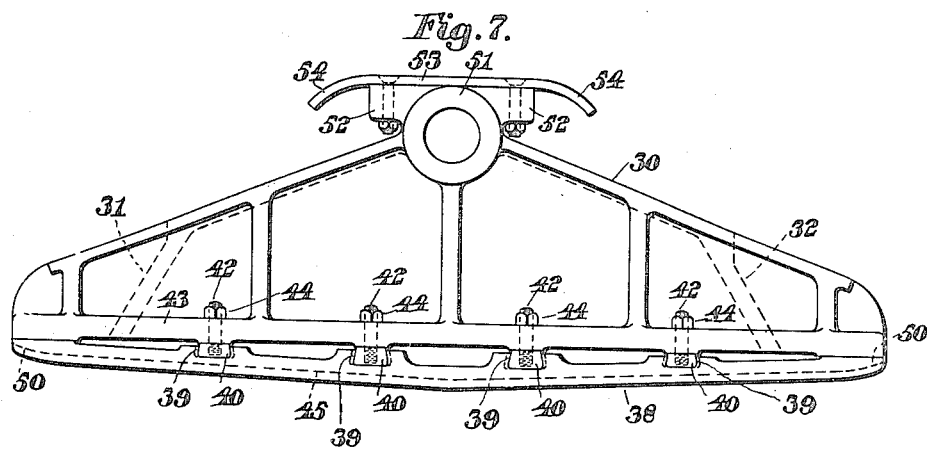
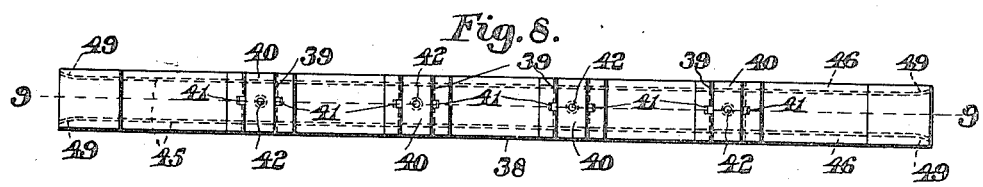
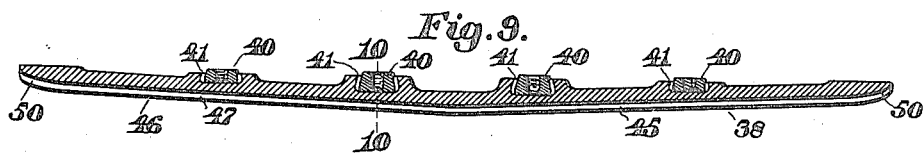
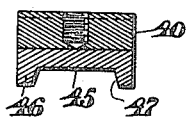

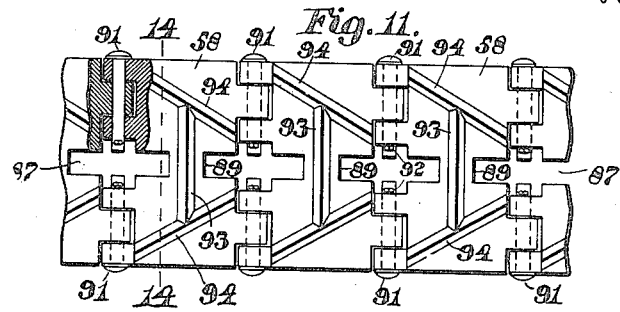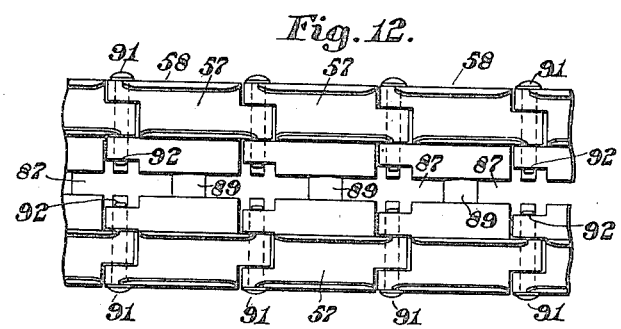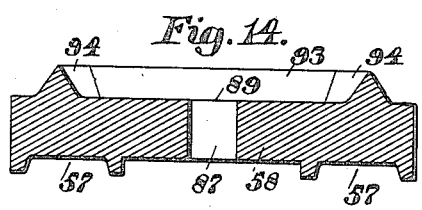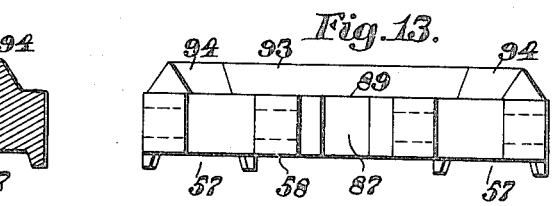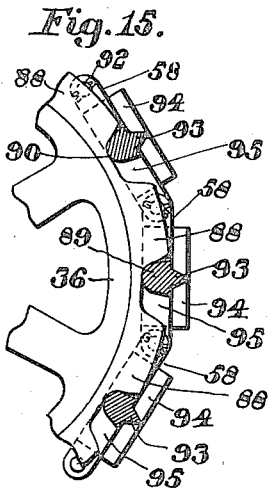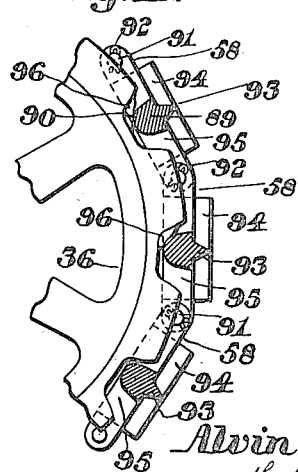

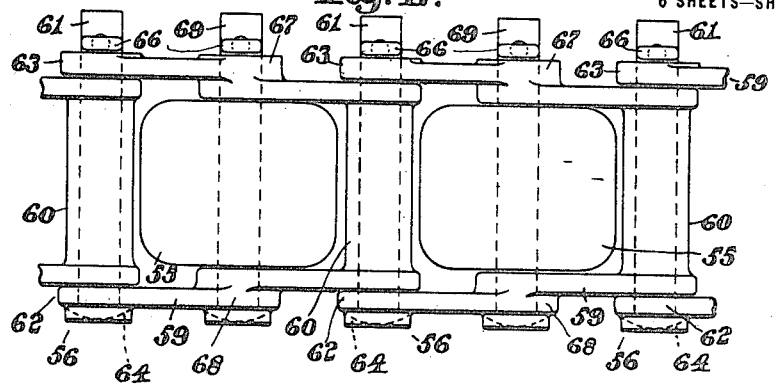

ALVIN O. LOMBARD, OF WATERVILLE, MAINE.

TRACTOR-TRUCK.

1,234,355.

Specification of Letters Patent.

Patented July 24, 1917.

Application filed April 22, 1916. Serial No. 93,341.

*To all whom it may concern:*

Be it known that I, ALVIN O. LOMBARD, a citizen of the United States of America, and a resident of Waterville, in the county of Kennebec and State of Maine, have invented certain new and useful Improvements in Tractor-Trucks, of which the following is a specification.

This invention relates to tractor trucks and particularly to machines of this character which are adapted to draw over the road a plurality of other vehicles.

One object of the invention is to provide the machine with a load-carrying platform above the tractors so constructed and arranged that the entire weight of the load will be supported by the tractors.

Another object of the invention is the provision of an improved construction of tractors whereby the operation of the tractor belts will be greatly improved.

A further object of the invention is the provision of means for simultaneously taking up the slack in the tractor belt and the roller belt coacting therewith.

The invention consists in certain novel features of construction and arrangement of parts which will be fully understood by reference to the description of the drawings and to the claims hereinafter given.

For the purpose of illustrating the invention, one preferred form thereof is illustrated in the drawings, this form having been found to give satisfactory and reliable results, although it is to be understood that the various instrumentalities of which the invention consists can be variously arranged and organized, and that the invention is not limited to the precise arrangement and organization of these instrumentalities as herein shown and described.

Of the drawings:

Figure 1 represents a side elevation of a tractor truck embodying the principles of the present invention, shown partly in section.

Fig. 2 represents a plan of the rear end of the same with the nearest tractor belt cut in section.

Fig. 3 represents an elevation of one of the front sprocket wheels, its shaft, the roller chain supporting wheel on said shaft, and the means for adjusting the position of said shaft longitudinally of the chassis.

Fig. 4 represents an inverted plan of the same.

Fig. 5 represents a vertical section of the same on line 5—5 on Fig. 4.

Fig. 6 represents a plan of one of the tractor runners.

Fig. 7 represents an elevation of the same.

Fig. 8 represents a plan of one of the runner shoes.

Fig. 9 represents a longitudinal section of same on line 9—9 on Fig. 8.

Fig. 10 represents a transverse section of the same on line 10—10 on Fig. 9.

Fig. 11 represents a plan of the tread surface of a portion of the tractor belt.

Fig. 12 represents a plan of the opposite side thereof.

Fig. 13 represents an end elevation of one of the sections of said belt.

Fig. 14 represents a transverse section thereof on line 14—14 on Fig. 11.

Fig. 15 represents a section of a portion of the tractor belt shown in its normal relation to its sprocket wheel.

Fig. 16 represents a similar view with the tractor belt shown in an abnormal position relatively to said sprocket wheel.

Fig. 17 represents a plan of a portion of the roller chain.

Fig. 18 represents an elevation of the same.

Fig. 19 represents a transverse section on line 19—19 on Fig. 18.

Fig. 20 represents a transverse section on line 20—20 on Fig. 18.

Fig. 21 represents an elevation of one of the roller chain pins, and

Fig. 22 represents an end elevation of the same.

Similar characters designate like parts throughout the several figures of the drawings.

In the drawings, 10 represents a chassis formed of the longitudinal members 11, 12, 13, and 14 connected together by means of the cross members 15 and 16. Depending from the under side of the front end of the chassis 10 are brackets 17 supporting the usual steering wheels 18. Near the forward end of the chassis 10 is mounted a motor 19 adapted to drive a shaft 20 extending longitudinally of said chassis. As the various steering mechanisms, clutch mechanisms, and brake mechanisms form no part of the present invention, they are not illustrated in detail in the drawings, and need no description, it being understood that these mechanisms may be of any well-known design.

To the rear end of the shaft 20 is secured a bevel pinion 21 meshing with a bevel gear 22, secured to and revoluble with a shaft 23 having pinions 24 on opposite ends thereof. Each pinion 24 meshes with a gear 25 secured to and revoluble with a short shaft 26. Each short shaft 26 is revolubly mounted in a pair of brackets 27 secured to and depending from the longitudinal members 11 and 12 and 13 and 14 respectively.

The longitudinal members 11, 12, 13, and 14 are also each provided with a bracket 28 in which is mounted a shaft 29. Between the longitudinal members 11 and 12 and between the longitudinal members 13 and 14 are positioned runners 30 pivotally mounted on the ends of the shaft 29 so that said runners may freely rock about the axis of said shaft. The rear end of each runner 30 is provided with a central slot 31 extending from the top to the bottom thereof, and the forward end of each runner is provided with a similar slot 32. Mounted upon each short shaft 26 and secured thereto is a sprocket wheel 33 in the same vertical plane with the slots 31 and 32. In advance of the runner 30 is a short shaft 34 supported in bearings 35 depending from the longitudinal members 11, 12, 13, and 14.

Mounted upon the short shaft 34 in the same plane with the sprocket wheel 33 is a sprocket wheel 36. Each pair of wheels 33 and 36 is adapted to support and drive an endless tractor belt 37, said tractor belt being adapted in its movement to pass beneath the runner 30. Each runner 30 has secured to its lower face two shoes 38, said shoes preferably being made of manganese steel or some similar metal. Each shoe is provided with a plurality of grooves 39 extending transversely of its upper face in which are positioned soft metal filling members 40 having ribs 41 extending into slots formed in the walls of said grooves 39 to prevent end movement of the filling members 40 in said grooves. The walls of said grooves 39 are inclined inwardly toward each other to prevent the upward displacement of said filling members 40.

Each filling member 40 has threaded or otherwise secured thereto a bolt 42 extending upwardly through the flange 43 on the outer faces of each of the runners 30. The shoe is secured in position against the under faces of the runner 30 by means of the nuts 44. Each shoe 38 has in its under face a groove 45 formed by the downwardly extending flanges 46, the inner walls 47 of which are inclined toward each other, as indicated in Fig. 10 of the drawings.

The inner walls 47 of the flanges 46 flare outwardly from each other at opposite ends of the shoe 38, as indicated at 49 in Fig. 8 of the drawings. The inner faces of the grooves 45 at the opposite ends of the shoe 38 curve upwardly as indicated at 50 in Figs. 7 and 9 of the drawings. The hubs 51 at the upper end of each of the runners 30 are each provided with outwardly extending alined ears 52, to the upper surfaces of which is secured a broad faced plate 53, the opposite ends of which are curved downwardly, as shown at 54 in Fig. 7 of the drawings. In the grooves 45 travel the rollers 55 of the roller chain 56, the flanges 46 preventing any lateral play of the roller chain as it travels along the groove 45 in each shoe 38. These rollers 55 extend into grooves 57 in the upper face 58 of the various sections of the tractor belt 37, thereby preventing any side movement of the tractor belt 37 as it moves beneath the runner 30.

The roller chain 56 is made up of a plurality of U-shaped links 59, the side portions thereof being connected at one end by a tubular member 60 through which extends a bolt 61, said bolt 61 also passing through the hubs 62 and 63 formed upon the side members of each link 59. The hub 62 is provided with a diametral slot 63 adapted to receive the flattened head 64 of the bolt 61 to prevent said bolt from turning when positioned within the hubs 62—63 and connecting member 60.

The bolt 61 is provided with an opening 65 in its opposite end adapted to receive a cotter pin 66, which, when in position, prevents any end movement of the bolt 61 and consequently any displacement of the head 64 from the slot 63 is obviated. This is of considerable advantage, as in view of the fact that the bolt 61 is locked from rotation in the hubs 62—63, there is no wear upon these hubs and all of the wear which takes place during the operation of the roller chain is confined to the inner wall of the longer connector 60.

Midway between the hubs 62 and 63 and the connector 60 are the hubs 67 and 68 through which extends the bolt 69 on which is revolubly mounted the roller 55. This bolt 69 is prevented from rotating in its bearings in the hubs 67 and 68 in the same manner as has been described in connection with the bolt 61. The roller chain 56 is endless and is supported by means of the grooved wheels 70, one of which is secured to each shaft 26 and 34 on each side of the sprocket wheels 33 and 36. These grooved wheels 70 are preferably made in two parts as indicated in Figs. 3 and 5 of the drawings, and when positioned upon the short shaft 26 or 34 are secured together by means of the bolts 71, as shown in Figs. 1 and 5 of the drawings.

The flanges 72 forming the grooves in the wheel 70 prevent any lateral movement of the roller chain 56 during its movement about the axes of the shafts 26 and 34. Between each pair of wheels 70 the roller chain 56 is supported by means of the broad faced plate 53 secured to the upper end of each runner 30. The short shaft 34 is mounted in the bearings 35 depending from the longitudinal members 11 and 12 and 13 and 14 respectively, these depending bearings being slidably mounted longitudinally of said members 11, 12, 13, and 14.

Each pair of bearings 35 is connected by means of a yoke 73, the parallel side members thereof having inwardly extending flanges 74 provided with a pair of longitudinal slots 75 through each of which extends a bolt 76 extending through the flanges of the longitudinal members 11, 12, 13, and 14, and secured thereto by means of the nuts 77. The lower ends of each pair of bolts 76 extend through openings in the opposite ends of a plate 78 with the heads 79 of said bolts bearing against downwardly extending flanges 80 formed upon said plate 78 and preventing the rotation of said bolt when once positioned.

The front end of each yoke 73 has extending therethrough the headed members 81 the threaded shanks of which pass through openings in the crossbar 16 and have threaded thereto the nuts 82 and 83. By means of these adjusting members 81, 82, and 83, the yoke 73 may be moved relatively to the chassis, and any slackness in the roller chain 56 or the tractor belt 37 may be taken up simultaneously.

End movement of the short shaft 34 is prevented by means of the plates 84 secured to the outer ends of the bearings 35 by means of the bolts 85, as shown in Figs. 3, 4, and 5 of the drawings. The short shafts 34 revolve freely in the bearings 35, and each bearing is provided with a suitable lubricating means 86 as indicated in Fig. 5. The wheels 70 are substantially one-half the diameter of the sprocket wheels 33 and 36, and inasmuch as the tractor chain 37 travels twice as fast as the roller chain 56, it is obvious that the rollers 55 on the roller chain 56 will not rotate about their pivots when moving about the axes of the shafts 26 and 34.

By making it possible for the roller chain to pass around the axes of the shafts 26 and 34 upon the grooved wheels 70 without rotating the rollers 55 further reduces the amount of wear upon the roller bolts 69, and consequently increases the life of the roller chain. The opposite ends of the grooves 57 in the tractor plate sections 58 flare outwardly away from each other, as indicated in Fig. 12 of the drawings, thereby preventing the rollers 55 of the roller chain 56 from getting out of alinement as they pass from one section 58 to the next adjacent section. The various sections 58 of the tractor belt have midway of their width longitudinal slots 87 in alinement, said slots being adapted to receive the teeth 88 of the sprocket wheels 33 and 36.

Intermediate the slots 87 at the opposite ends of each section 58 is a connector 89, the upper portion of which is curved as shown at 90 in Figs. 15 and 16 of the drawings. The opposite ends of adjacent sections 58 are connected together by means of two short pins 91 in alinement and separated at their inner ends the width of the slots 87. These connecting pins 91 are provided with heads on their outer ends and have cotter pins 92 extending through their inner ends adapted to prevent displacement thereof.

The outer face of each section 58 is provided with a transverse rib 93 and an inclined rib 94 at either end thereof. In the movement of the tractor over the ground or other surface these ribs 93 and 94 are adapted to engage with the surface in an obvious manner, the inclined ribs 94 preventing side movement of the tractor. The spaces 95 between the various teeth 88 of the sprocket wheels 33 and 36 are of greater length than the thickness of the connector 89 of the sections 58 forming the tractor belt. Ordinarily the distance from the edge of one tooth to the corresponding edge of the next tooth is the same as the distance between two adjacent connectors 89, as shown in Fig. 15 of the drawings, and if the tractor belt could always assume the position shown in Fig. 15 of the drawings a long space between the adjacent teeth 88 would be unnecessary. In practice, however, at times the spaces 98 become more or less filled with dirt or other foreign substances, as indicated at 96 in Fig. 16 of the drawings. When this occurs it is obvious that the tractor belt will be forced outwardly from the axis of the shaft 26 or 34 and the belt will move through a larger circle than under normal conditions. As the distances between the axes of the pivot pins 91 never vary, it is obvious that the connectors 89 will assume the various positions relatively to the teeth 88, as indicated in Fig. 16 of the drawings, thereby making it necessary to have the spaces 95 of greater length than the width of the connectors 89 to overcome this difficulty.

The longitudinal members 12 and 13 of the chassis extend to the front of the machine and are connected together in any well-known manner, and these two longitudinal members support the engine, the body of the car, and the various driving mechanisms. The outer longitudinal members 11 and 14 extend only to the center of the chassis at a point immediately in front of the tractors as shown in Fig. 2 of the drawings. These longitudinal members 11 and 14 are outside of the tractors, as indicated in Fig. 2 of the drawings, and are provided with upwardly extending brackets 97, to the upper ends of which are secured a load supporting platform 98.

The center of this platform 98 is substantially over the pivot 29 of the tractor runners 30, thereby equally distributing the entire load carried thereby over the entire pair of tractors. This is of great advantage as it balances the load and relieves to a large extent the amount of work upon the motors 19.

It is obvious that, owing to the inclined ribs 94 on the various tread sections, any skidding of the truck will be prevented. At the same time, these inclined ribs 94 and the cross rib 93 will impinge upon any surface over which the truck is being moved in either direction.

By an inspection of Fig. 1 of the drawings, it will be noted that the sprocket wheels 33 and 36 are located so that the peripheral surfaces thereof are considerably above the under face of the shoe 38. This location of the sprocket wheels at a high elevation relatively to the shoe 38 has many advantages, as when traveling over the road if the tractor belt 37 comes into contact with stones or other obstacles the said belt is permitted to move upwardly and at the same time rock the runners 30 about the pivots 29 so that an inclined tread surface is thereby effected which will easily ride over said obstacles. This action will take place whether the truck is moving forwardly or to the rear.

When the runner 30 moves into an abnormal position about its pivot 29 the sprocket wheels 33 and 36 will enter the slots 31 and 32 provided therefor. The provision of these slots 31 and 32 make it possible to locate the sprocket wheels nearer to the pivot 29 of the runner 30 and at the same time give perfect freedom to the runners 30 as they rock about their axes 29. The teeth of the sprocket wheels 33 and 36 have broad faces and substantially fill the slots 87 in the tread sections 58.

It is obvious that when the tread sections 58 pass around the sprocket wheels 33 and 36 these tread sections 58 will have movement relatively to each other about the pivots 91 and thus cause their pivot ends to move relatively to the broad faced teeth 88.

As a consequence of these combined movements and the broad face of the said teeth 88, any substance which becomes lodged in the slots 87 will be forced therefrom as the tractor belt 37 moves about the sprocket wheels 33 and 36. Heretofore tractor belts were provided with rollers upon the pivots between the various tread sections, and these rollers entered the space 95 in the sprocket wheels 33 and 36 between the teeth 88. Considerable difficulty was found, however, with these rollers, as they quickly became worn from constant use and it was found to be of great advantage to provide the various tread sections 58 with a sprocket wheel engaging member intermediate the length of said tread sections 58, as for instance, the connector 89. By providing the various tread sections of the tractor belt with the grooves 57 and the shoes 38 with the groove 45, the various roller chains 56 are retained in parallelism at all times, and lateral movement of the roller chains 56 and tractor belts 37 is absolutely prevented.

The flaring ends 49 of the flanges 46 and the flaring ends of the grooves 45 on the shoe 38 and the flaring ends of the grooves 57 on the tread sections 58 permit the rollers 55 of the chain 56 to pass freely from one tread section to another, as well as into the groove 45 on the shoe 38 without danger of engaging an abutting shoulder which would interfere with the operation of the various movable parts.

By making the shoes 38 detachable from the runner 30, when either of the shoes becomes worn or otherwise out of commission, it may be quickly removed and replaced by a new shoe without removing the runners 30.

This makes a very effective tractor truck which possesses many advantages over trucks heretofore in use, as has heretofore been pointed out in the specification.

It is believed that the operation and many advantages of this invention will be fully understood from the foregoing description.

Having thus described my invention, I claim:

1. In a machine of the class described, the combination of a chassis; alined brackets depending from said chassis; two runners pivotally mounted on said brackets and having continuous bearing faces on the under portions thereof, said runners being movable bodily about the pivotal connections with said brackets; a revoluble shaft supported on said chassis in front of each runner; a second revoluble shaft supported on said chassis in rear of each of said runners; a tractor belt for each runner; means on said revoluble shafts for supporting and moving said tractor belt; means for driving one of said shafts; and means mounted on said chassis for adjusting the position of one of said revoluble shafts relatively to the other.

2. In a machine of the class described, the combination of a chassis; alined brackets depending from said chassis; two runners pivotally mounted on said brackets and having slotted ends; a revoluble shaft supported on said chassis in front of each runner; a second revoluble shaft supported on said chassis in rear of each of said runners; a tractor belt for each runner; sprocket wheels on said revoluble shafts for supporting and moving said tractor belt, said wheels being of less thickness than the slots in said runners; and means for driving one of said shafts, 3. In a machine of the class described, the combination of a chassis; alined brackets depending from said chassis; two runners pivotally mounted on said brackets and having slotted ends; a revoluble shaft supported on said chassis in front of each runner; a second revoluble shaft supported on said chassis in rear of each of said runners; a tractor belt for each runner; means on said revoluble shafts for supporting and moving said tractor belt and adapted to enter the slots in the end of said runners when the latter are moved about their pivot; and means for driving the rear shaft.

4. In a machine of the class described, the combination of a chassis; alined brackets depending from said chassis; two runners pivotally mounted on said brackets; a revoluble shaft supported on said chassis in front of each runner; a second revoluble shaft supported on said chassis in rear of each of said runners; a tractor belt for each runner; means on said revoluble shafts for supporting and moving said tractor belt; means for driving one of said shafts; and a plurality of rollers interposed between each runner and its tractor belt and movable along the under faces of said runners.

5. In a machine of the class described, the combination of a chassis; alined brackets depending from said chassis; two runners pivotally mounted on said brackets; a revoluble shaft supported on said chassis in front of each of said runners; a second revoluble shaft supported on said chassis in rear of each of said runners; a tractor belt for each runner; sprocket wheels on said revoluble shafts over which said tractor belts pass; a flanged wheel secured to and revoluble with each revoluble shaft on each side of each of said sprocket wheels; and a roller chain on each pair of flanged wheels and movable between the under face of each of said runners and its tractor belt.

6. In a machine of the class described, the combination of a chassis; alined brackets depending from said chassis; two runners pivotally mounted on said brackets; a revoluble shaft supported on said chassis in front of each of said runners; a second revoluble shaft supported on said chassis in rear of each of said runners; a tractor belt for each runner; sprocket wheels on said revoluble shafts over which said tractor belts pass; a flanged wheel secured to and revoluble with each revoluble shaft on each side of each of said sprocket wheels; and a roller chain on each pair of flanged wheels and movable between the under face of each of said runners and its tractor belt, the diameter of said flanged wheels being approximately one-half the diameter of said sprocket wheels.

7. In a machine of the class described, the combination of a chassis; alined brackets depending from said chassis; two runners pivotally mounted on said brackets; a revoluble shaft supported on said chassis in front of each of said runners; a second revoluble shaft supported on said chassis in rear of each of said runners; a tractor belt for each runner; sprocket wheels on said revoluble shafts over which said tractor belts pass; a flanged wheel secured to and revoluble with each revoluble shaft on each side of each of said sprocket wheels; and a roller chain on each pair of flanged wheels and movable between the under face of each of said runners and its tractor belt, the diameter of said flanged wheels being such that the rollers in said roller chain will not turn while moving in contact with the periphery of said wheels.

8. In a machine of the class described, the combination of a chassis; alined brackets depending fram said chassis; two runners pivotally mounted on said brackets; a revoluble shaft supported on said chassis in front of each of said runners; a second revoluble shaft supported on said chassis in rear of each of said runners; a tractor belt for each runner; sprocket wheels on said revoluble shafts over which said tractor belts pass; a flanged wheel secured to and revoluble with each revoluble shaft on each side of each of said sprocket wheels; a roller chain on each pair of flanged wheels and movable between the under face of each of said runners and its tractor belt; and a plate above said runner pivots adapted to support said roller chains at a point midway between said flanged wheels.

9. In a machine of the class described, the combination of a chassis; alined brackets depending from said chassis; two runners pivotally mounted on said brackets; a revoluble shaft supported on said chassis in front of each of said runners; a second revoluble shaft supported on said chassis in rear of each of said runners; a tractor belt for each runner; sprocket wheels on said revoluble shafts over which said tractor belts pass; a flanged wheel secured to and revoluble with each revoluble shaft on each side of each of said sprocket wheels; a roller chain on each pair of flanged wheels and movable between the under face of each of said runners and its tractor belt; and a broad faced plate above said runner pivots adapted to support said roller chains at a point midway between said flanged wheels.

10. In a machine of the class described, the combination of a chassis; alined brackets depending from said chassis; two runners pivotally mounted on said brackets; a revoluble shaft supported on said chassis in front of each runner; a second revoluble shaft supported on said chassis in rear of said runners; a tractor belt for each runner; means for supporting and moving said tractor belt; and a detachable shoe of hardened material for each runner.

11. In a machine of the class described, the combination of a chassis; alined brackets depending from said chassis; two runners pivotally mounted on said brackets; a revoluble shaft supported on said chassis in front of each runner; a second revoluble shaft supported on said chassis in rear of said runners; a tractor belt for each runner; means for supporting and moving said tractor belt; and a detachable shoe of hardened material for each runner having a shallow groove extending the entire length thereof.

12. In a machine of the class described, the combination of a chassis; alined brackets depending from said chassis; two runners pivotally mounted on said brackets; a revoluble shaft supported on said chassis in front of each runner; a second revoluble shaft supported on said chassis in rear of said runners; a tractor belt for each runner; means for supporting and moving said tractor belt; and a detachable shoe of hardened material for each runner having a shallow groove extending the entire length thereof with inclined faces at the opposite ends thereof.

13. In a machine of the class described, the combination of a chassis; alined brackets depending from said chassis; two runners pivotally mounted on said brackets, each having a vertical slot at each end; a revoluble shaft supported on said chassis in front of each runner; a second revoluble shaft supported on said chassis in rear of said runners; a tractor belt for each runner; means for supporting and moving said tractor belt; and a detachable shoe of hardened material secured to the bottom of each runner on each side of said slots, said shoes each having downwardly extending flanges with the inner walls flaring outwardly at opposite ends of said shoe.

14. In a machine of the class described, the combination of a chassis; alined brackets depending from said chassis; two runners pivotally mounted on said brackets; a revoluble shaft supported on said chassis in front of each runner; a second revoluble shaft supported on said chassis in rear of said runners; a tractor belt for each runner; means for supporting and moving said tractor belt; a detachable shoe of hardened material for each runner having soft metal blocks dovetailed into its upper side; and members extending from said blocks and secured to said runner.

15. In a machine of the class described, the combination of a pivoted runner; revoluble shafts in front and in rear of said runner; a sprocket wheel revoluble with each shaft and having broad faced teeth; a tractor belt on said sprocket wheels with a portion in contact with the under face of said runner, said belt comprising a plurality of sections having ears at opposite ends; and two alined pins extending through the ears of adjacent sections and connecting them together, each pair of alined pins being separated from each other at their inner ends and adapted to receive a sprocket tooth between them.

16. In a machine of the class described, the combination of a pivoted runner; revoluble shafts in front and in rear of said runner; a sprocket wheel revoluble with each shaft and having broad faced teeth; a tractor belt on said sprocket wheels with a portion in contact with the under face of said runner, said belt comprising a plurality of sections having ears at opposite ends; two alined headed pins extending through the ears of adjacent sections and connecting them together, each pair of alined pins being separated from each other at their inner ends and adapted to receive a sprocket tooth between them; and cotters extending through the opposite ends of said pins.

17. In a machine of the class described, the combination of a runner having a groove in its under face; a revoluble shaft at each end of said runner; a sprocket wheel thereon; a tractor belt mounted on said sprocket wheels and having the tops of its various tread sections provided with upwardly extending parallel flanges; and a chain interposed between said runner and said tread sections and provided with rollers adapted to travel in said groove and between said flanges.

18. In a machine of the class described, the combination of a runner having two grooves in its under face; a revoluble shaft at each end of said runner; a sprocket wheel thereon; a tractor belt mounted on said sprocket wheels and having the tops of its various tread sections provided with two pair of upwardly extending parallel flanges near the outer edges thereof; and two chains interposed between said runner and said tread sections and provided with rollers adapted to travel in said grooves and between said flanges.

19. In a machine of the class described, the combination of a runner having a groove in its under face; a revoluble shaft at each end of said runner; a sprocket wheel thereon; a tractor belt mounted on said sprocket wheels and having the tops of its various tread sections provided with upwardly extending parallel flanges the adjacent walls of which flare outwardly from each other at their opposite ends; and a chain interposed between said runner and said tread sections and provided with rollers adapted to travel in said groove and between said flanges.

20. In a machine of the class described, the combination of a runner having a groove in its under face; a revoluble shaft at each end of said runner; a sprocket wheel thereon; a tractor belt mounted on said sprocket wheels and having the tops of its various tread sections provided with upwardly extending parallel flanges, the adjacent walls of which are inclined outwardly from each other; and a chain interposed between said runner and said tread sections and provided with rollers adapted to travel in said groove and between said flanges.

21. In a machine of the class described, the combination of a runner having two grooves in its under face; a revoluble shaft at each end of said runner, a sprocket wheel thereon; a tractor belt mounted on said sprocket wheels and having the tops of its various tread sections provided with two parallel grooves; and a chain interposed between said runner and said tread sections and provided with rollers adapted to travel in said grooves.

22. In a machine of the class described, the combination of a runner having two grooves in its under face; a revoluble shaft at each end of said runner; a sprocket wheel thereon; a tractor belt mounted on said sprocket wheels and having the tops of its various tread sections provided with two parallel grooves the bottoms of which incline downwardly at opposite ends; and a chain interposed between said runner and said tread sections and provided with rollers adapted to travel in said grooves.

23. In a machine of the class described, the combination of a pivoted runner; revoluble shafts in front and in rear of said runner; a sprocket wheel revoluble with each shaft and having broad faced teeth; and a tractor belt comprising a plurality of tread sections pivotally connected together, each tread section having central slots at opposite ends to receive said teeth, said slots forming two side portions joined by a narrow connector.

24. In a machine of the class described, the combination of a pivoted runner; revoluble shafts in front and in rear of said runner; a sprocket wheel revoluble with each shaft and having broad faced teeth; and a tractor belt comprising a plurality of tread sections pivotally connected together, each tread section having central slots at opposite ends to receive said teeth, said slots forming two side portions joined by a narrow connector having a semi-cylindrical upper end.

25. In a machine of the class described, the combination of a chassis; a runner pivotally mounted thereon; an endless tractor belt coacting with said runner and consisting of a plurality of tread sections pivotally connected together and having central alined slots in the ends thereof; a pair of belt supporting sprocket wheels revolubly supported from said chassis and having broad faced teeth each adapted to enter two adjacent slots in said tread sections and prevent lateral movement thereof relatively to each other; and means for driving one of said sprocket wheels.

26. In a machine of the class described, the combination of a chassis; a runner pivotally mounted thereon; an endless tractor belt coacting with said runner and consisting of a plurality of tread sections pivotally connected together and having central alined slots in the ends thereof; a pair of belt supporting sprocket wheels revolubly supported from said chassis and having broad faced teeth each adapted to enter two adjacent slots in said tread sections and extending entirely through said tread sections whereby any material in said slots may be forced therefrom; and means for driving one of said sprocket wheels.

27. In a machine of the class described, the combination of a chassis; a runner pivotally mounted thereon; an endless tractor belt coacting with said runner and consisting of a plurality of tread sections pivotally connected together by two alined and separated pivot members and having central alined slots in the ends thereof dividing each of said sections in two portions, each tread section having its two portions connected by a part midway of the length of said section; a pair of belt supporting sprocket wheels revolubly supported from said chassis and having peripheral depressions adapted to receive said connecting parts; and means for driving one of said sprocket wheels.

28. In a machine of the class described, the combination of a chassis; a runner pivotally mounted thereon; an endless tractor belt coacting with said runner and consisting of a plurality of tread sections pivotally connected together and having central alined slots in the ends thereof dividing each of said tread sections in two portions, each tread section having its two portions connected by a part midway of the length of said section; a pair of belt supporting sprocket wheels revolubly supported from said chassis and having peripheral depressions adapted to receive said connecting parts, said depressions being of greater length than the thickness of said connecting parts; and means for driving one of said sprocket wheels.

29. In a machine of the class described, a revoluble shaft; a sprocket wheel thereon; means for rotating said shaft; a runner in front of said sprocket wheel adapted to rock about a center intermediate its ends; a second revoluble shaft in front of said runner; a sprocket wheel thereon; a tractor belt comprising a plurality of tread sections rabbeted together by two series of end projections adjacent the opposite edges thereof; a pivot member through each series of projections; and a shouldered member integral with said tread section adapted to coact with the teeth of a sprocket wheel.

30. In a machine of the class described, the combination of a revoluble shaft; a sprocket wheel thereon; means for rotating said shaft; a runner in front of said sprocket wheel adapted to rock about a center, intermediate its ends; a second revoluble shaft in front of said runner; a sprocket wheel thereon; an l a flexible tractor belt movable beneath sai runner composed of tread sections pivoted together and provided with portions intermediate their ends adapted to engage the teeth of said sprocket wheels and with ribs on their outer faces.

31. In a machine of the class described, the combination of a revoluble shaft; a sprocket wheel thereon; means for rotating said shaft; a runner in front of said sprocket wheel adapted to rock about a center intermediate its ends; a second revoluble shaft in front of said runner; a sprocket wheel thereon; a flexible tractor belt movable beneath said runner composed of tread sections pivoted together and provided with portions intermediate their ends adapted to engage the teeth of said sprocket wheels and with ribs on their outer faces; and means for preventing lateral movement of said belt relatively to said runner.

32. In a machine of the class described, the combination of a revoluble shaft; a sprocket wheel thereon; means for rotating said shaft; a runner in front of said sprocket wheel adapted to rock about a center intermediate its ends; a second revoluble shaft in front of said runner; a sprocket wheel thereon; a flexible tractor belt movable beneath said runner composed of tread sections pivoted together and provided with portions intermediate their ends adapted to engage the teeth of said sprocket wheels and with ribs on the outer faces; and antifriction members interposed between the bottom of said runners and said tractor belt.

33. In a machine of the class described, the combination of a revoluble shaft; a sprocket wheel thereon; means for rotating said shaft; a runner in front of said sprocket wheel adapted to rock about a center intermediate its ends; a second revoluble shaft in front of said runner; a sprocket wheel thereon; a flexible tractor belt movable beneath said runner composed of tread sections pivoted together and provided with portions intermediate their ends adapted to engage the teeth of said sprocket wheels and with ribs on their outer faces; and a roller chain interposed between the bottom of said runner and said tractor belt.

34. In a machine of the class described, the combination of a revoluble shaft; a sprocket wheel thereon; means for rotating said shaft; a runner in front of said sprocket wheel adapted to rock about a center intermediate its ends; a second revoluble shaft in front of said runner; a sprocket wheel thereon; a flexible tractor belt movable beneath said runner composed of tread sections pivoted together and provided with portions intermediate their ends adapted to engage the teeth of said sprocket wheels and with ribs on their outer faces; a roller chain interposed between the bottom of said runner and said tractor belt; and means on said runner adapted to prevent lateral movement of said roller chain.

35. In a machine of the class described, the combination of a revoluble shaft; a sprocket wheel thereon; means for rotating said shaft; a runner in front of said sprocket wheel adapted to rock about a center intermediate its ends; a second revoluble shaft in front of said runner; a sprocket wheel thereon; a flexible tractor belt movable beneath said runner composed of tread sections pivoted together and provided with portions intermediate their ends adapted to engage the teeth of said sprocket wheels and with ribs on their outer faces; a roller chain interposed between the bottom of said runner and said tractor belt; and means on said tractor belt adapted to prevent lateral movement thereof relatively to said roller chain.

36. In a machine of the class described, the combination of a revoluble shaft; a sprocket wheel thereon; means for rotating said shaft; a runner in front of said sprocket wheel adapted to rock about a center intermediate its ends; a second revoluble shaft in front of said runner; a sprocket wheel thereon; a flexible tractor belt movable beneath said runner composed of tread sections pivoted together and provided with portions intermediate their ends adapted to engage the teeth of said sprocket wheels and with ribs on their outer faces; a slidable yoke having bearings for said second shaft; and means for adjusting the position of said yoke relatively to said runner.

37. In a machine of the class described, the combination of a revoluble shaft; a sprocket wheel thereon; means for rotating said shaft; a runner in front of said sprocket wheel adapted to rock about a center intermediate its ends; a second revoluble shaft in front of said runner; a sprocket wheel thereon; a flanged wheel mounted on each of said shafts on each side of said sprocket wheels; two roller chains supported by said flanged wheels and movable beneath the outer faces of said runner; a flexible tractor belt movable beneath said roller belts composed of tread sections pivoted together and provided with portions intermediate their ends adapted to engage the teeth of said sprocket wheels and with ribs on their outer faces; and means for simultaneously taking up the slack in said tractor belt and said roller chains.

38. In a machine of the class described, the combination of a revoluble shaft; a sprocket wheel thereon; means for rotating said shaft; a runner in front of said sprocket wheel adapted to rock about a center intermediate its ends; a second revoluble shaft in front of said runner; a sprocket wheel thereon; a flanged wheel mounted on each of said shafts on each side of said sprocket wheels; two roller chains supported by said flanged wheels and movable beneath the outer faces of said runner; a flexible tractor belt movable beneath said roller belts composed of tread sections pivoted together and provided with portions intermediate their ends adapted to engage the teeth of said sprocket wheels and with ribs on their outer faces; a slidable yoke having bearings for said second shaft; and means for adjusting the position of said yoke relatively to said runner.

Signed by me at Waterville, Maine, this 11th day of April A. D. 1916.

ALVIN O. LOMBARD.

Witnesses:
C. N. PERKINS,
FRANK O. DEAN.